G. HERRNSTEIN.
HEAD-BLOCKS FOR SAW-MILLS.
No. 184,619. Patented Nov. 21, 1876.
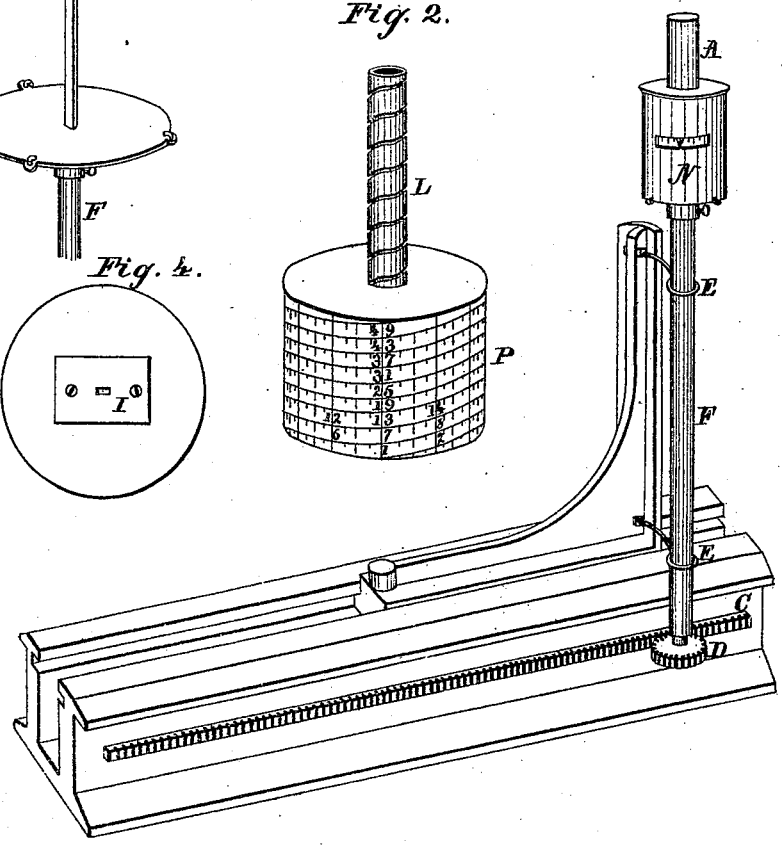
Witnesses:
L. Ely Franklin
L. P. Schaffer
Inventor:
George Herrnstein.

UNITED STATES PATENT OFFICE.

GEORGE HERRNSTEIN, OF CHILLICOTHE, OHIO.

IMPROVEMENT IN HEAD-BLOCKS FOR SAW-MILLS.

Specification forming part of Letters Patent No. 184,619, dated November 21, 1876; application filed September 23, 1876.

*To all whom it may concern:*

Be it known that I, GEORGE HERRNSTEIN, of Chillicothe, in the county of Ross and State of Ohio, have invented a new and useful Improvement in Head-Blocks for Saw-Mills, which improvement is fully set forth in the following specification, reference being had to the accompanying drawings.

The object of my invention is to have a sawyer's revolving rule or gage fastened to the knee of a circular-saw-mill head-block. It stands above the knee, and is bolted to it. It moves with the knee, and is always in sight, so that both the sawyer and setter can see it without leaving their places. The old rule is cut in the body of the head-block, and is always indistinct from the oil and sawdust collecting on it, and is inconvenient from its position, which requires the men to leave their places before they can see it. The improved rule or gage indicates on both sides, and can be read from either side of the carriage, and from its position and construction is calculated to remedy the above defects. (See the accompanying drawings.)

N is a cylinder of suitable metal, having an opening in two sides, through which the gage can be read, and an indicator attached to it immediately over the center of each opening, as shown in Fig. 1. A is a small metallic cylinder secured to the top of the cylinder N, and provided with an iron tube threaded in the inside. E E are wrought-iron arms bolted to the knee of the head-block. F is an iron tube, supported by the arms E E, and which supports the gage. D is a pinion attached to the lower end of a shaft, H, and gearing into a rack, C, in the block. P is a wooden cylinder fitting into the cylinder N. It is ruled spirally from top to bottom, and graduated to indicate inches and fractions of an inch from bottom to top. L is a wrought-iron tube, threaded upon its outer surface, and working in the cylinder A. I represents the bottom of the cylinder P. It is provided with a light iron plate, having a small rectangular hole in the center. H is a shaft, working in the tube F, which, by means of the pinion D upon its lower end, turns the wooden cylinder P.

I claim as my invention—

The improvement in circular-saw mills herein described, consisting of a rack and an upright gage supported upon a metallic tube, secured in wrought-iron arms bolted to the knee of the head-block, all constructed to operate as shown and described, and for the purpose specified.

GEORGE HERRNSTEIN.

Witnesses:
S. ELY FRANKLIN,
L. P. SCHAFFER.